United States Patent [19]

Hayakawa

[11] Patent Number: 4,742,759
[45] Date of Patent: May 10, 1988

[54] CERAMIC INSERT CAST PISTON

[75] Inventor: Issei Hayakawa, Nagoya, Japan

[73] Assignee: NGK Insulators, Ltd., Japan

[21] Appl. No.: 41,620

[22] Filed: Apr. 22, 1987

Related U.S. Application Data

[63] Continuation of Ser. No. 701,034, Feb. 12, 1985, abandoned.

[30] Foreign Application Priority Data

Feb. 23, 1984 [JP] Japan .................. 59-33108

[51] Int. Cl.⁴ .................................................. F02F 3/00
[52] U.S. Cl. ............................................ 92/176; 92/212; 92/213; 92/224
[58] Field of Search ............ 29/156.5 R; 92/176, 92/212, 213, 218, 220, 222, 224, 231, 248, 260; 123/193 P, 669

[56] References Cited

U.S. PATENT DOCUMENTS

| | | |
|---|---|---|
| 1,462,655 | 7/1923 | Philip . |
| 4,245,611 | 1/1981 | Mitchell et al. ............ 92/176 X |
| 4,495,684 | 1/1985 | Sander et al. .............. 92/213 X |
| 4,506,593 | 3/1986 | Sugiyama et al. ............ 92/212 |
| 4,553,472 | 11/1985 | Munro et al. ................ 92/176 |

FOREIGN PATENT DOCUMENTS

| | | |
|---|---|---|
| 2158646 | 5/1973 | Fed. Rep. of Germany . |
| 3110292 | 9/1982 | Fed. Rep. of Germany . |
| 3230388 | 2/1984 | Fed. Rep. of Germany . |
| 1327095 | 4/1963 | France . |
| 2092709 | 8/1982 | United Kingdom ............ 123/193 P |

*Primary Examiner*—Gerald A. Michalsky
*Attorney, Agent, or Firm*—Parkhurst & Oliff

[57] ABSTRACT

Disclosed herein is a ceramic insert cast piston for an internal combustion engine which includes a head made of ceramic, a metal ring fitted around the peripheral portion of the ceramic head, and a piston body made of a metal by casting a metal around the ceramic head with the metal ring thereon, wherein an air insulating layer in the form of an annular groove is formed at the inner periphery of the metal ring and a buffer member is interposed between the ceramic head and the casting metal piston body.

20 Claims, 4 Drawing Sheets

CERAMIC INSERT CAST PISTON

This is a continuation of application Ser. No. 701,034 filed Feb. 12, 1985, now abandoned.

BACKGROUND OF THE INVENTION (1) Field of the Invention:

The present invention relates to a ceramic insert cast piston. More particularly, the invention relates to a piston for an internal combustion engine in which a piston head made of a ceramic material is insert cast into a metal.

(2) Description of the Prior Art:

Recently, there have been trials with respect to pistons for internal combustion engines, wherein a piston head and a metal piston body are separately formed. Particularly, a ceramic having a high thermal resistance and a low heat conductivity is used as the piston head, and the ceramic piston head is integrally engaged with a metal piston body, whereby the combustion efficiency is increased, the engine output is improved, the discharge amount of hydrocarbons and carbon monoxide is reduced, and fuel consumption is decreased.

There is an insert casting as one of the methods by which the ceramic piston head (hereinafter referred to briefly as "ceramic head") is engaged with the metal piston body. According to the insert casting method, after the ceramic head member is deposited into a mold, a molten metal is cast into the mold with the ceramic head member, thereby integrating the ceramic head and the metal piston body.

However, this method suffers from the drawbacks that the ceramic head is likely to be broken due to the thermal shock which occurs during casting, and the large difference in the heat expansion between the ceramic material and the metal piston body loosens the engagement therebetween, so that when the piston is under reciprocal movement at a high speed, a piston head slips out from the piston body or the local stress is imposed upon the ceramic head, wherein fracture begins to occur.

Further, it is necessary to design the ceramic head in a form of a complicated core in order to prevent the ceramic head from slipping out from the metal piston body.

SUMMARY OF THE INVENTION

It is therefore an object of the present invention to eliminate the above-mentioned drawbacks of the prior art ceramic insert cast piston.

More specifically, an object of the present invention is to provide a ceramic insert cast piston in which the structure of the ceramic head is simplified.

It is an another object of the present invention to provide a ceramic insert cast piston which mitigates the thermal shock experienced by a ceramic member during insert casting.

It is still another object of the present invention to provide a ceramic insert cast piston having a structure which strengthens the joining between the ceramic head and the metal piston body so as to prevent the ceramic head from slipping out from the metal piston body.

It is a further object of the present invention to provide a ceramic insert cast piston having a structure which prevents local stress from being imposed upon the ceramic head.

The ceramic insert cast piston according to the present invention is a piston for internal combustion engines in which a ceramic head having a metal ring fitted around the peripheral portion of the ceramic head is insert cast with a metal, wherein a heat insulating air layer in a form of an annular groove is provided around the inner periphery of the metal ring, and a buffer member is arranged between the ceramic head and the casting metal.

These and other objects, features, and advantages of the invention will be apparent upon reading of the following description of the invention when taken in conjunction with the attached drawings, with the understanding that some modifications, variations and changes thereof could be esily made by the skilled in the art to which the invention pertains without departing from the spirit of the invention or the scope of claims appended hereto.

BRIEF DESCRIPTION OF THE DRAWINGS

For a better understanding of the invention, reference is made to the accompanying drawings, wherein.

DETAILED DESCRIPTION OF THE PREFERRED EMBODIMENTS OF THE INVENTION

Figure 1:
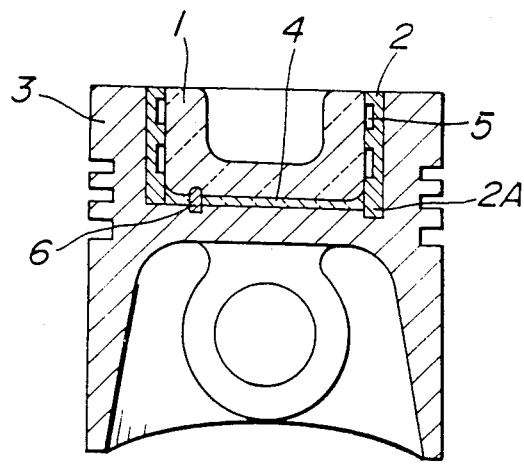
FIGS. 1–7 are sectional views of ceramic insert cast pistons according to the present invention, FIG. 5 being a sectional view of FIG. 6 as viewed from a line V—V and FIG. 6 being a sectional view of FIG. 5 as viewed from an arrow VI—VI.

The more detailed construction of the ceramic insert cast piston according to the present invention will be explained with reference to embodiments shown in the drawings.

In FIG. 1 is shown a first embodiment of the ceramic insert cast piston according to the present invention. A metal ring 2 having heat insulating air layers 5, in the form of an annular groove at the inner periphery thereof, is fitted around the peripheral portion of a ceramic head 1, and the ceramic head with the metal ring is received in a recess provided at the top portion of a metal piston body 3. The rotation between the metal ring 2 and the metal piston body 3 is restricted by a rotation restriction means 2A which is formed by downwardly extending a part of the base portion of the metal ring. A buffer member 4 is interposed between the ceramic head 1 and the metal piston body 3, and the relative movement between the ceramic head 1 and the metal piston body 3 is restricted by means of a rotation restriction pin 6 via the buffer member 4.

As the material constituting the ceramic head 1, use may be made of oxides such as $Al_2O_3$, $ZrO_2$ and $MgAl_2O_4$, carbides such as SiC, $B_4C$, and TiC, nitrides such as $Si_3N_4$, AlN, and TiN, oxynitride such as sialon, composite materials such as FRC (fiber reinforced ceramic), cordierite, glass ceramic and so on. The ceramic head 1 is molded according to the ordinary ceramic-molding method such as a die pressing method, a slip casting method, an injection molding method. Among them, the slip casting method and the injection molding method are particularly advantageous in that a molding in a shape near a final profile can be obtained. After the molding obtained by these methods is calcined, as the cse may be, it is machined into a profile which allows the metal ring 2 to be fitted therearound, and a final firing and the subsequent finish machining are performed to form an intended ceramic head.

Thereafter, the metal ring 2 having heat insulating air layer or layers 5 in the form of an annular groove is/are formed in the inner periphery thereof, is fitted to the ceramic head 1. The annular groove provided in the inner periphery of the metal ring 2 has the effect of reducing heat transferred to the ceramic head 1 during casting, preventing the ceramic head 1 from being fractured due to the thermal shock, and reducing the combustion heat transferred to the metal piston body 3 through the ceramic head 1 when the piston is operated. The coefficient of heat expansion of the metal ring 2 preferably takes a medium value between those of the ceramic head 1 and the metal piston body 3, but the metal ring is not necessarily restricted to the one having such a coefficient of heat expansion so long as it exhibits the above effects.

It may be that the ceramic head 1 and the metal ring 2 as both separately formed in a cylindrical form and are merely fitted together by an appropriate means such as press fitting, but the fitting is preferably done by an expansion fitting method in which after the ceramic head 1 is cooled by using liquid nitrogen as a cooling medium, the metal ring 2, placed under an ordinary temperature, is fitted around the ceramic head 1, or a shrinkage fitting method in which the metal ring 2 is heated and fitted around the ceramic head 1 placed under an ordinary temperature.

The rotation restriction means 2A for the metal ring 2 has a construction wherein a part of the end portion of the metal ring is inserted into the metal piston body 3, and acts to prevent loosening of the engagement between the metal ring 2 and the metal piston body 3 due to rotation. The buffer member 4 is interposed between the bottom portion of the ceramic head 1 and the metal piston body 3. The material of the buffer member is preferably a material having a thermal resistance with abundant elasticity, and mention may be made of ceramic fibers such as SiC fibers, alumina fibers, asbestos as preferred examples thereof.

The metal ring 2, as well as the buffer member 4, function to mitigate the large difference in the heat expansion between the casting metal piston body 3 and the ceramic head 1, and also to firmly integrate the ceramic head 1 and the metal piston body 3. That is, they reduce the thermal shock which results when the casting metal is poured during the casting operation so that the fracture of the ceramic head 1 may be prevented, and they mitigate the thermal stress due to the difference in the heat expansion between the ceramic and the metal during cooling after the solidification of the casting metal so that the metal ring 2 and the casting metal piston body 3 may be firmly integrated. Further, when the engine is operated at a high temperature, the metal ring 2 and the buffer member 4 also function to mitigate the difference in the heat expansion between the ceramic head 1 and the metal piston body 3 so that the ceramic head 1 may be prevented from slipping out from the metal piston body 3.

The rotation restriction pin 6 acts to prevent loosening between the ceramic head 1 and the metal piston body 3 through rotation. As the pin, one having a spherical shape, a cylindrical shape, or an elliptical spherical shape may be used. As the material for the pin, a ceramic having the same material as the ceramic head as well as a ceramic having the thermal resistance or a metal having a thermal resistance may be used.

After the ceramic head 1, around which is fitted the metal ring 2 provided with the heat insulating air layers 5 in a form of an annular groove at the inner periphery thereof, is placed into a mold and the above-mentioned rotation restriction pin 6 is placed, in order, a molten metal of an aluminum alloy or the like is poured, thereby integrating the ceramic head 1 and the metal piston body 3.

In the following, the same numerals denote the same or similar parts in FIG. 1.

Figure 2:
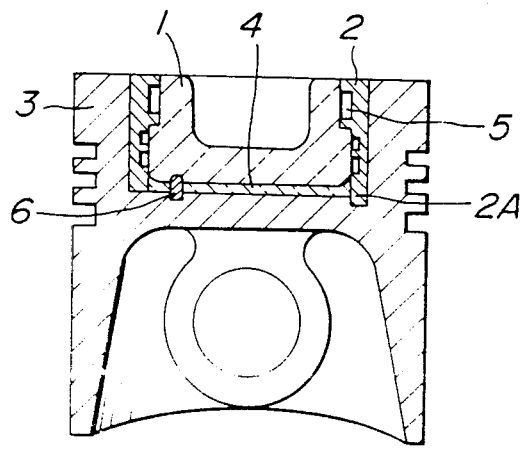
Figure 3:
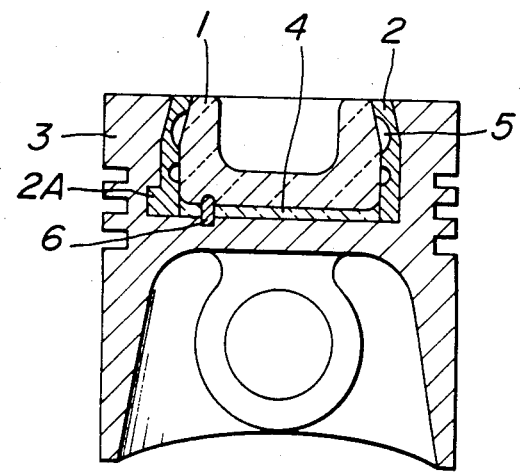
Figure 4:
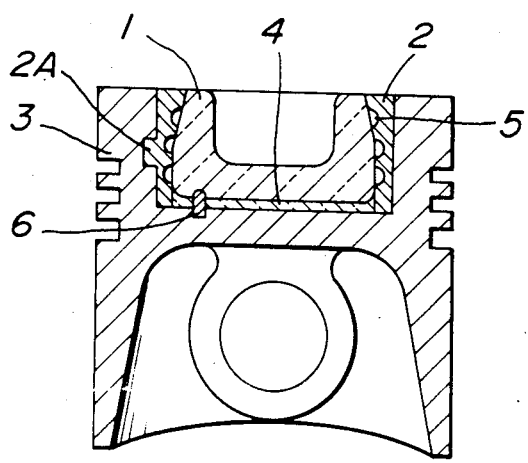

FIGS. 2–4 illustrate other embodiments of the ceramic insert cast piston according to the present invention. In FIG. 2 is shown an embodiment in which the outer periphery of the ceramic head 1 and the inner periphery of the metal ring 2 are both shaped in a stepped form. FIGS. 3 and 4 show embodiments in which the inner upper portion of the metal ring 2 is inwardly inclined and the rotation restriction means 2A is formed at the peripheral portion of the metal ring 2. According to these embodiments, since the inner upper portion of the metal ring 2 is projected or inclined inwardly, the ceramic head 1 hardly slips out from the metal ring 2, and the rotation restriction means 2A of the metal ring 2 acts to not only restrict the rotation but also prevents the ceramic head from slipping out from the metal piston body 3. In the embodiments shown in FIGS. 2–4, the engagement between the ceramic head 1 and the metal ring 2 becomes firmer than in the case of the cylindrical engagement as shown in FIG. 1.

Figure 5:
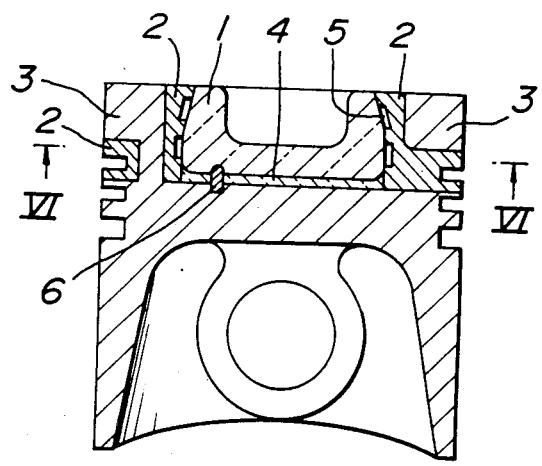
Figure 6:
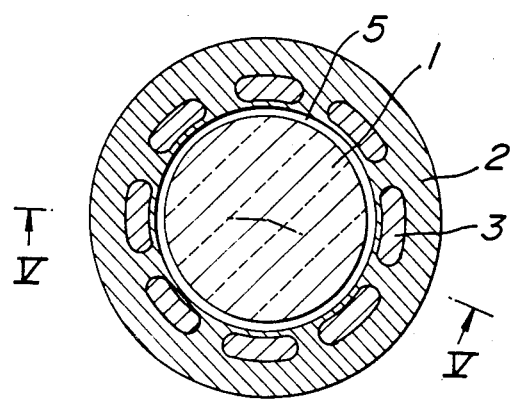

FIGS. 5 and 6 show a still another embodiment of the ceramic insert cast piston according to the present invention. In this embodiment, the metal ring 2 is so constructed that the casting metal which constitutes the metal piston body 3 enters over the metal ring 2 through long elliptical holes shown in FIG. 6 which are provided in the metal ring 2 so as to firmly integrate the metal ring 2 and the metal piston body 3.

Figure 7:
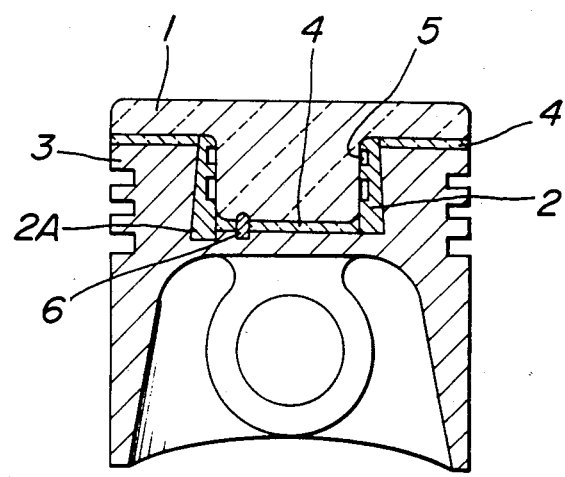

FIG. 7 shows a still further embodiment of the ceramic insert cast piston according to the present invention. The outer upper portion of the metal ring 2 is inclined inwardly to perform the integration with the metal piston body 3. The whole top portion of the metal piston body 3 is covered with the ceramic head 1. As compared with the embodiments shown in FIGS. 1-6 in which the ceramic head 1 is entirely received into the metal piston body 3, the heat insulating effect of the ceramic head 1 can be further enhanced. Further, in the embodiment of FIG. 7, the buffer member 4 is interposed between the bottom of the upper portion of the ceramic head 1 and the peripheral top portion of the metal piston body 3 and between the central bottom of the ceramic head and the metal piston body 3 so that a large difference in the heat expansion between the casting metal piston body 3 and the ceramic head 1 is mitigated to firmly integrate the ceramic head 1 and the metal piston body 3.

The outer peripheral profile of the ceramic head 1 may be a cylindrical shape, a stepped shape, a tapered shape or the like, as shown in FIGS. 1–7, but each of them is not a complicated core-like shape. Thus, the machining is extremely easy.

In the illustrated embodiments, it is shown that a plurality of the heat insulating air layers 5 are provided, and the sectional profile is rectangular, square or semi-circular. However, the number of the air heat insulating layer 5 may be one, and any arbitrary profile may be employed as the sectional profile thereof besides the rectangular, square or semi-circular shape.

As mentioned above in detail, according to the ceramic insert cast piston of the present invention, the metal ring having heat insulating air layers in the form of an annular groove in the inner periphery thereof is fitted around the peripheral portion of the ceramic head, the buffer member is interposed between the ceramic head and the metal piston body, and insert casting is performed with the metal. Therefore, the thermal shock to be imparted upon the ceramic is mitigated during casting, the ceramic head is prevented from slipping out from the metal piston body, and the ceramic head is extremely firmly integrated with the metal piston body. Further, since no slack is produced between the ceramic head and the metal piston body, and no local stress is imposed upon the ceramic member, the ceramic member is protected from being fractured during operation. In addition, the profile of the peripheral portion of the ceramic head can be simplified.

As has been described in the above, the ceramic insert cast piston according ot the present invention suffers from less disorder as compared with conventional pistons and therefore is extremely industrially useful.

What is claimed is:

1. A ceramic insert cast piston for an internal combustion engine, comprising:
    a ceramic head having an outer peripheral portion;
    an annular metal ring having an inner peripheral portion and an outer peripheral portion, said inner peripheral portion of the metal ring having at least one annular groove therein and said inner peripheral portion of the metal ring being fitted to the outer peripheral portion of the ceramic head such that at least one annular heat insulating air space is formed between the metal ring and the ceramic head;
    a cast metal piston body having an inner peripheral portion and an outer peripheral portion, wherein said ceramic head with said metal ring fitted thereto are located within said inner peripheral portion of the metal piston body; and
    a buffer member located between the ceramic head and the metal piston body, wherein said at least one annular heat insulating air space functions to reduce heat transferred to the ceramic head during casting of the metal piston body therearound, to prevent the ceramic head from being fractured due to thermal shock and to reduce combustion heat transferred to the metal piston body during operation of the internal combustion engine.

2. A ceramic insert cast piston according to claim 1, wherein the inner peripheral portion of the metal ring is inwardly projected at an upper portion thereof.

3. A ceramic insert cast piston according to claim 1, wherein the metal ring is provided with a rotation restriction means.

4. A ceramic insert cast piston according to claim 1, wherein a rotation restriction means extends between the ceramic head and the metal piston body.

5. A ceramic insert cast piston according to claim 1, wherein the ceramic head comprises a material selected from the group consisting of zirconia and silicon nitride.

6. A ceramic insert cast piston according to claim 1, wherein the buffer member comprises a ceramic fiber.

7. A ceramic insert cast piston according to claim 6, wherein said ceramic fiber comprises a material selected from the group consisting of SiC, alumina and asbestos.

8. A ceramic insert cast piston according to claim 1, wherein said metal ring is fitted to the ceramic head by a fitting process selected from the group consisting of press fitting, expansion fitting and shrink fitting.

9. A ceramic insert cast piston according to claim 1, wherein said metal ring has a coefficient of expansion which is intermediate between a coefficient of expansion of the ceramic head and the metal piston body.

10. A ceramic insert cast piston according to claim 1, wherein a rotation restriction pin is inserted into said ceramic head, said buffer member and said metal piston body.

11. A ceramic insert cast piston for an internal combustion engine, comprising:
    a ceramic head having an outer peripheral portion, a top portion exposed to a combustion chamber and a bottom portion;
    an annular metal ring having an inner peripheral portion and an outer peripheral portion, said inner peripheral portion of the metal ring having at least one annular groove therein and said inner peripheral portion of the metal ring being fitted to the outer peripheral portion of the ceramic head such that at least one annular heat insulating air space is formed between the metal ring and the ceramic head;
    a cast metal piston body having an inner peripheral portion and an outer peripheral portion, wherein said ceramic head with said metal ring fitted thereto are located within said inner peripheral portion of the metal piston body; and
    a buffer member located between said bottom portion of the ceramic head and the metal piston body, wherein said at least one annular heat insulating air space functions to reduce heat transferred to the ceramic head during casting of the metal piston body therearound, to prevent the ceramic head from being fractured due to thermal shock and to reduce combustion heat transferred to the metal piston body during operation of the internal combustion engine.

12. A ceramic insert cast piston according to claim 11, wherein the inner peripheral portion of the metal ring is inwardly projected at an upper portion thereof.

13. A ceramic insert cast piston according to claim 11, wherein the metal ring is provided with a rotation restriction means.

14. A ceramic insert cast piston according to claim 11, wherein a rotation restriction means extends between the ceramic head and the metal piston body.

15. A ceramic insert cast piston according to claim 11, wherein the ceramic head comprises a material selected from the group consisting of zirconia and silicon nitride.

16. A ceramic insert cast piston according to claim 11, wherein the buffer member comprises a ceramic fiber.

17. A ceramic insert cast piston according to claim 11, wherein said metal ring is fitted to the ceramic head by a fitting process selected from the group consisting of press fitting, expansion fitting and shrink fitting.

18. A ceramic insert cast piston according to claim 11, wherein said metal ring has a coefficient of expansion which is intermediate between a coefficient of expansion of the ceramic head and the metal piston body.

19. A ceramic insert cast piston according to claim 11, wherein said buffer member comprises a material selected from the group consisting of SiC, alumina and asbestos.

20. A ceramic insert cast piston according to claim 11, wherein a rotation restriction pin is inserted through said bottom portion of the ceramic head, said buffer member and said metal piston body.

* * * * *